United States Patent
Kanota et al.

[11] Patent Number: 5,973,868
[45] Date of Patent: *Oct. 26, 1999

[54] RECORDING AND/OR REPRODUCING APPARATUS WITH MEANS FOR ESTABLISHING AN AFTER-RECORDING AREA

[75] Inventors: Keiji Kanota; Yukio Kubota; Takahito Seki, all of Kanagawa, Japan

[73] Assignee: Sony Corporation, Tokyo, Japan

[ * ] Notice: This patent is subject to a terminal disclaimer.

[21] Appl. No.: 08/769,230

[22] Filed: Dec. 18, 1996

Related U.S. Application Data

[60] Continuation of application No. 08/297,229, Aug. 26, 1994, Pat. No. 5,596,457, which is a division of application No. 08/026,735, Mar. 5, 1993, Pat. No. 5,426,538.

[30] Foreign Application Priority Data

Mar. 13, 1992 [JP] Japan .................................. 4-089434
Jul. 24, 1992 [JP] Japan .................................. 4-217472

[51] Int. Cl.$^6$ .............................. G11B 5/09; G11B 5/584; H04N 5/95
[52] U.S. Cl. ......................... 360/48; 360/51; 360/77.14; 386/88
[58] Field of Search ................................. 360/48, 51, 64, 360/77.12, 77.14, 77.15, 53, 18; 386/88

[56] References Cited

U.S. PATENT DOCUMENTS

| | | | |
|---|---|---|---|
| 4,755,893 | 7/1988 | Yamada et al. | 360/18 |
| 5,084,786 | 1/1992 | Konno et al. | 360/53 |
| 5,282,096 | 1/1994 | Morisaki et al. | 360/64 |
| 5,424,850 | 6/1995 | Inoue et al. | 386/100 |
| 5,598,388 | 1/1997 | Van Maren et al. | 360/48 |

Primary Examiner—Aristotelis M. Psitos
Assistant Examiner—Regina Y. Neal
Attorney, Agent, or Firm—Frommer Lawrence & Haug, LLP.; William S. Frommer; Dennis M. Smid

[57] ABSTRACT

Rotary head recording and/or reproducing apparatus in which respective oblique tracks on a record medium are scanned, each track having an information signal area in which information data is recorded and a track following area in which a tracking control pilot signal is recorded. The track following area precedes the information signal area; and in the preferred embodiment, an additional track following area follows the information signal area. The pilot signal is recorded in only a portion of the track following area, the remainder of which has timing sync data recorded therein. In an after-recording mode the timing sync data is reproduced, detected and used as a reference to define an after-record area.

10 Claims, 8 Drawing Sheets

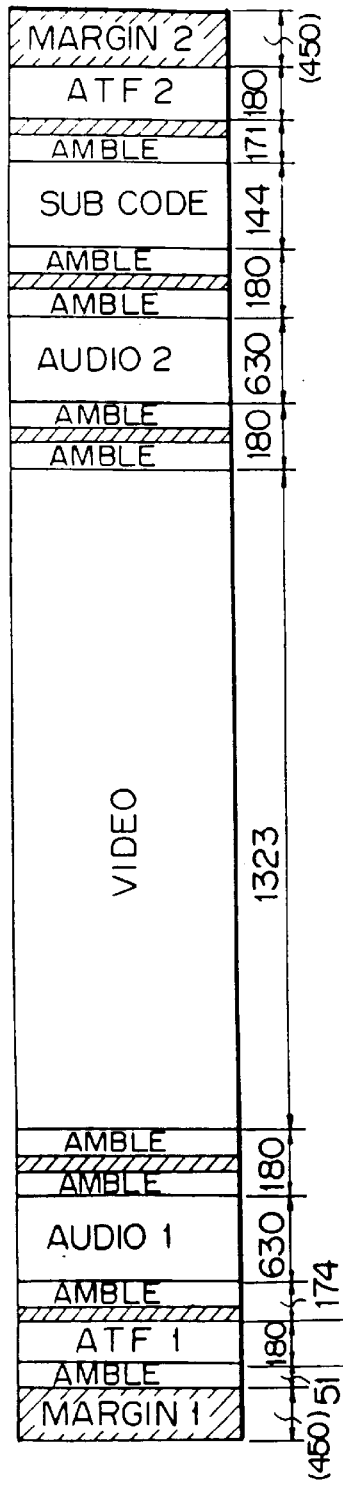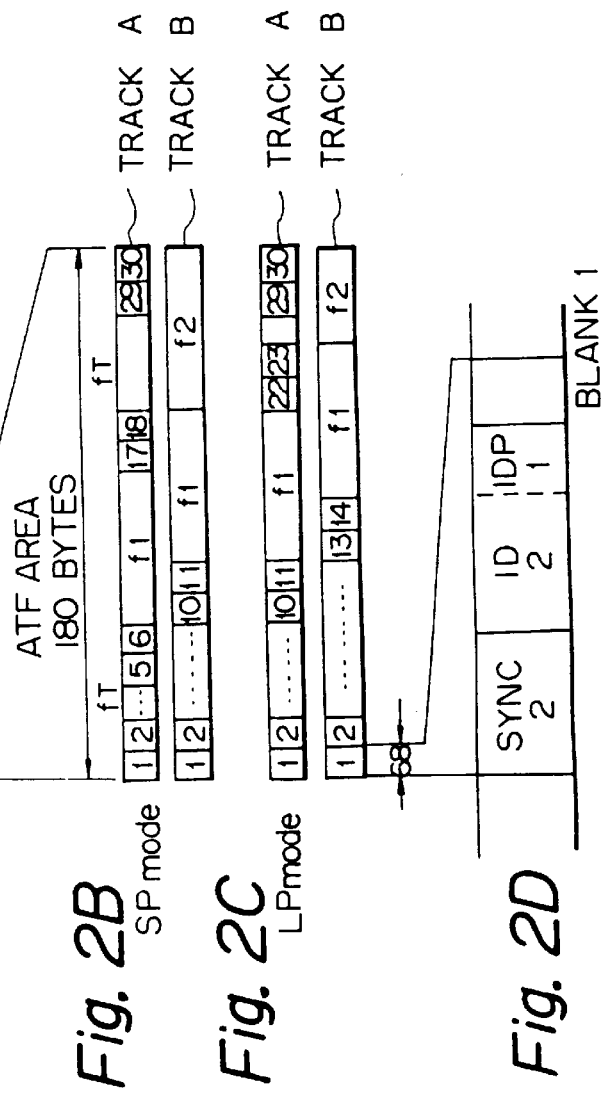
Fig. 2A  Fig. 2B SP mode  Fig. 2C LP mode  Fig. 2D

Fig. 3
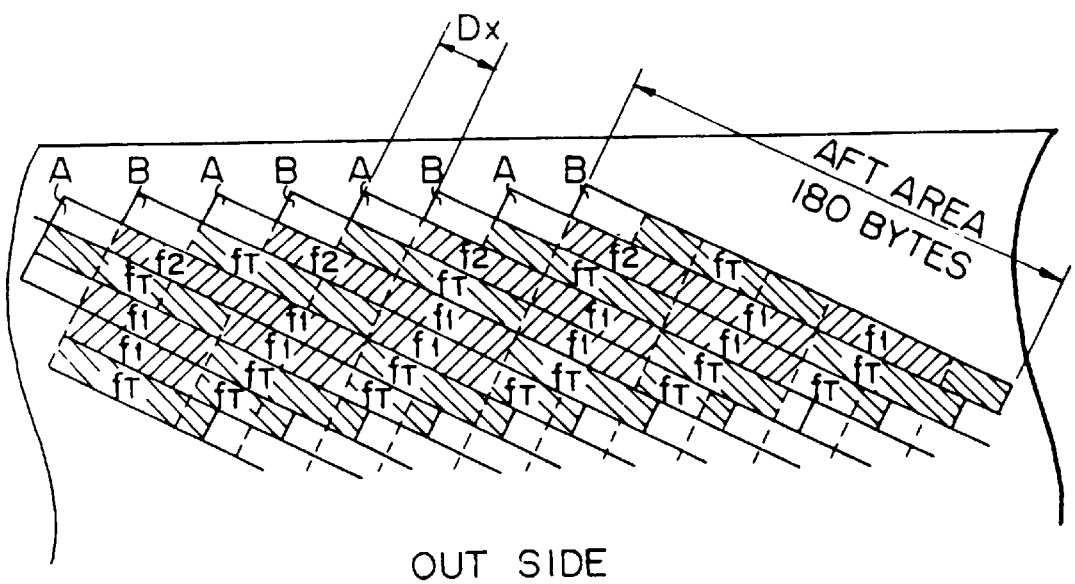
OUT SIDE
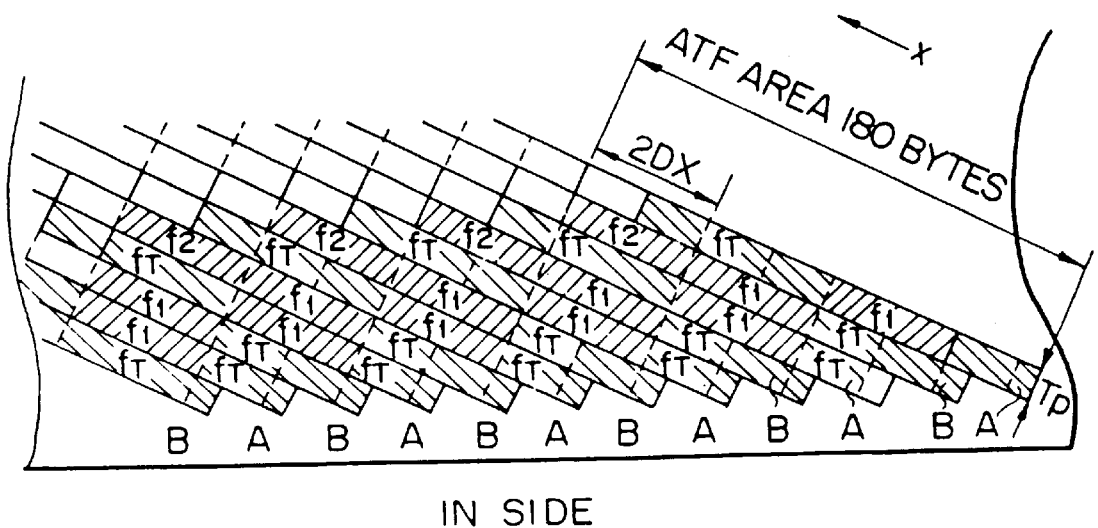
IN SIDE

Fig. 5A
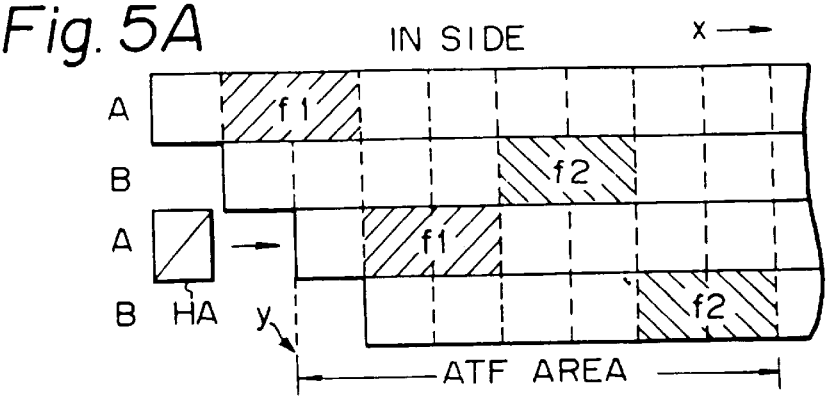
Fig. 5B (i)
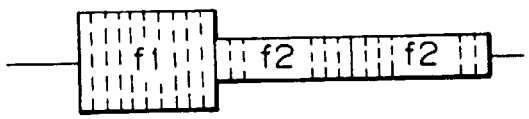
Fig. 5B (ii)
Fig. 5B (iii)
Fig. 5B (iv)
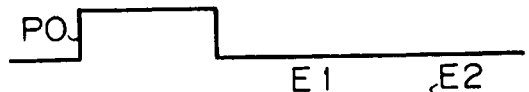
Fig. 5B (v)
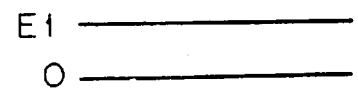
Fig. 5B (vi)
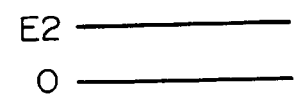
Fig. 5C
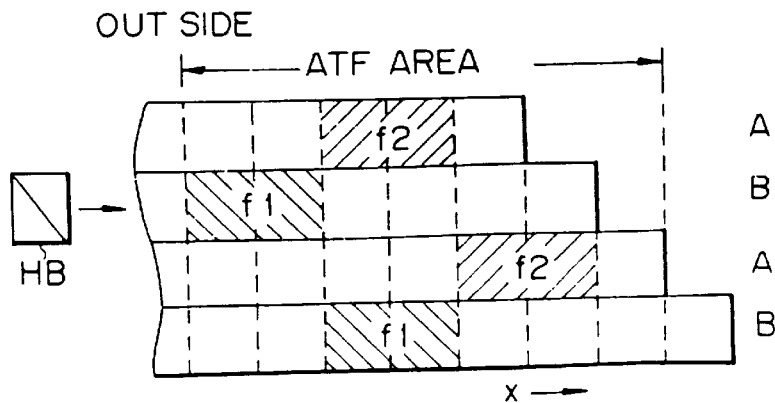

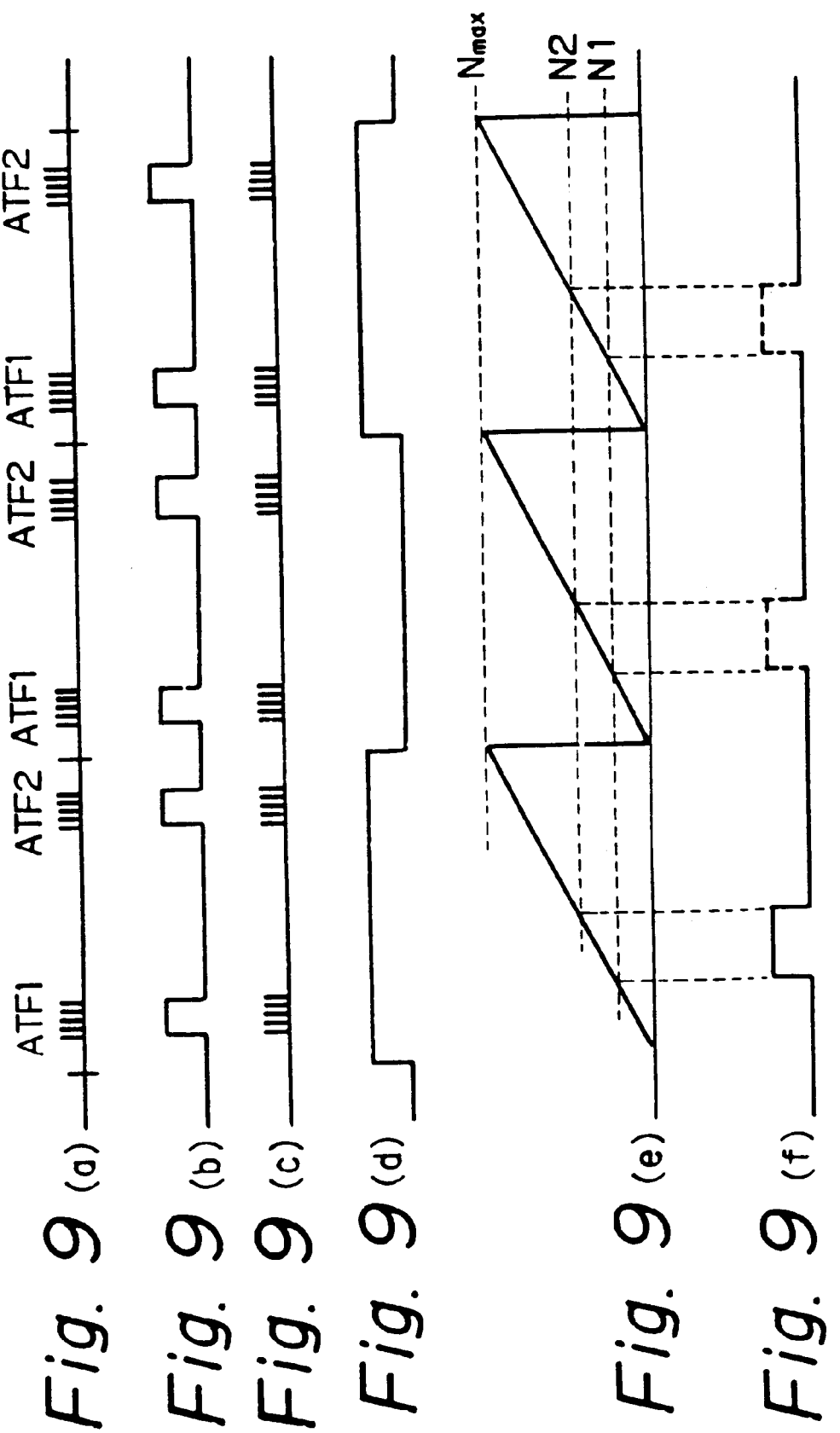

RECORDING AND/OR REPRODUCING APPARATUS WITH MEANS FOR ESTABLISHING AN AFTER-RECORDING AREA

This application is a continuation of application Ser. No. 08/297,229, filed Aug. 26, 1994, now U.S. Pat. No. 5,596,457 which is a division of application Ser. No. 08/026,735, filed Mar. 5, 1993 now U.S. Pat. No. 5,426,538.

BACKGROUND OF THE INVENTION

This invention relates to rotary head recording and/or reproducing apparatus of the type which records/reproduces tracks containing an information signal area and a track following area, the latter being used in a reproducing operation to control the tracking of a head as it scans a track and, more particularly, to such apparatus wherein timing sync data is recorded in the track following area for the purpose of establishing a precise afterrecord area for the after-recording of additional information in the track.

Rotary head recorders have long been used to record video signals and, more recently, to record digital audio signals, the latter being recorded on digital audio tape (DAT). In such rotary head recorders, information, such as video information, audio information or multiplexed video and audio information are recorded in an oblique track across a record tape or other record medium and such information may be recorded in analog or digital form. Digital recorders of the rotary head type generally provide superior performance characteristics because of the inherent advantages derived from digital recording techniques, namely the accuracy with which a recorded digital signal may be reproduced and the ability to rely upon digital error correction techniques, such as error correction codes, to compensate for errors that, nevertheless, may be introduced during the recording or reproducing operation. A typical digital video recorder, as an example, records at least three types of information in a track: a digital video signal, a digital audio signal and a digital subcode signal which may be used as a control signal, such as a display control signal. In such digital video recorders, the video, audio and subcode information typically are recorded in time division multiplexed form such that the video information is recorded in a video section, the audio information is recorded in one or more audio sections and the subcode information is recorded in a subcode section in a track. In addition, and to assure reliability during a reproducing operation, it is common to record a pilot signal in one or more additional areas in the track, such areas being designated automatic track following (ATF) areas.

In one proposal for a digital rotary head recorder, ATF areas are disposed in advance of the information area (i.e. an ATF area is scanned before audio, video and subcode information is scanned) and also in areas which follow the information area. As a rotary head rotates into scanning relationship with a track, the head begins its scan at a head entering end of the track and the head rotates out of its recording relation with the track at a head leaving end. ATF areas are recorded in the vicinity of the head entering end and the head leaving end, respectively. The pilot signals which are reproduced from the head entering end ATF area and from the head leaving end ATF area are used in a servo loop to adjust the speed at which the tape is transported, thereby assuring that the heads are generally centered over the respective tracks which they scan.

It often is desirable to operate rotary head recorders of the aforementioned type in an after-recording mode. An after-recording mode also is known as a dubbing mode wherein audio information, for example, is after-recorded in a track at a time subsequent to the recording of video information in that track. Such audio information may be a translation of audio signals from one language to another, thereby "dubbing" such audio information in synchronism with the movement of, for example, a subject's lips. As another example, the audio information may be in the form of a "voice over" but, nevertheless, is related to the video information. Such voice over techniques are well known and are commonly used in video production, programming and the like. In addition to after-recording audio information, as just described, it also is common to record video information or even subcode information in an after-recording mode. In these after-recording operations it is important to define with accuracy the particular area in a track in which the audio or video or subcode information is to be after-recorded. For example, if audio information is to be after-recorded, it is important that such audio information be recorded only in the allotted audio sections so as to avoid inadvertent erasure or "over-writing" of video information. Likewise, if video information is to be after-recorded, it is important that the beginning and end of the video signal area be defined accurately so that the after-recorded video information is recorded substantially only in the video area and does not erase previously recorded audio or subcode information. Likewise, if subcode data is to be after-recorded, it is important that the subcode area be defined accurately so that subcode data is recorded substantially only in that area.

Since ATF areas are recorded in preceding and following relation with respect to information areas (it will be understood that the term "information area" is intended to refer to one or more, or even all, of the audio, video and subcode areas), it had been thought that, in an after-recording mode, the pilot signal normally recorded in the ATF area can be detected and used to define the appropriate after-recording area. However, the pilot signal typically is nothing more than a burst of pilot frequency. If that burst is detected at the beginning of the ATF area and used as a reference from which the after-recording area is established, it is expected that the after-recording area will properly begin at the very beginning of the information area. But, if the pilot burst is not detected until the middle or even the end of the ATF area, then the beginning of the after-recording area may be somewhat delayed. This delay often is quite variable and unpredictable. Consequently, the after-recording area may begin too late, thus leaving previously recorded information which should have been erased (or overwritten); and the after-recording area may extend into a section of the track which should not have been erased. Thus, by relying upon the accurate detection of a pilot signal, the precise definition or establishing of the after-recording area generally cannot be carried out with a high degree of accuracy. Hence, desired signals which should not have been erased by after-recording may, in fact, be over-written. This problem is exacerbated by the fact that the frequency of the pilot signal normally recorded in the ATF area is quite low, which means that the pilot signal might not be accurately detected until a substantial portion of the ATF area has been scanned.

OBJECTS OF THE INVENTION

Therefore, it is an object of the present invention to provide rotary head recording/reproducing apparatus which overcomes the aforenoted disadvantages, drawbacks and difficulties and permits an after-recording area to be established (or defined) accurately and consistently.

Another object of this invention is to provide rotary head recording/reproducing apparatus which records/reproduces oblique tracks containing ATF and information areas and which records a pilot signal in a portion of the ATF areas and also records timing sync data in the remainder of the ATF areas.

A further object of this invention is to provide apparatus of the aforementioned type in which the timing sync data includes information representative of the location thereof in the ATF area, thereby providing an accurate reference from which the beginning and end of after-recording areas may be established.

Various other objects, advantages and features of the present invention will become readily apparent from the ensuing detailed description, and the novel features will be particularly pointed out in the appended claims.

SUMMARY OF THE INVENTION

In accordance with this invention, rotary head recording and/or reproducing apparatus is provided with rotary head means to scan respective oblique tracks on a record medium, such as (but not limited to) a magnetic tape. Each track includes an information signal area containing information data and is preceded by a track following area containing a tracking control pilot signal. In a recording mode, the pilot signal is recorded in a portion of the track following area and timing sync data is recorded in substantially the remainder of the track following area.

In one embodiment, each track includes a head entering end whereat a head means rotates into recording or reproducing relation with the record medium and a head leaving end whereat the head means rotates out of recording or reproducing relation. Track following areas are disposed in the vicinity of the head entering end and in the vicinity of the head leaving end.

As one aspect of this invention, the timing sync data is comprised of plural timing sync data blocks, each block being of predetermined length. The timing sync data block includes a synchronizing data pattern, identification data and error correcting data associated with the identification data. The timing sync data blocks precede the pilot signal in the track following area; and in those track following areas recorded in the vicinity of the head entering end, timing sync data blocks also follow the pilot signal, thus surrounding the pilot signal in the track following area.

In an after-recording mode, the timing sync data is reproduced from the track following area and detected to establish a reference from which the after-record area is defined. As a feature, the identification data included in each timing sync data block identifies the position of the timing sync data block within the track following area. A preset count which represents the position of the scanning head means along the track is produced in response to each detected identification data, and this count is loaded into a counter which counts clock pulses derived from the signals reproduced from the record medium as the record medium is being scanned. When the counter reaches a predetermined count, an after-record start indication is produced to represent the start of the after-recording area. Preferably, an after-record end indication is produced when the counter is incremented to a second count. The feature of presetting the counter provides additional accuracy in defining the after-recording area even if jitter, ATF errors or errors in signal reproduction may be present. Hence, the counter is accurately preset and the after-recording area is accurately defined even if unexpected errors in the recording or reproducing operations otherwise interfere with proper operation of the counter. In the preferred embodiment, the counter is not preset until the identification data from n successive timing sync data blocks are detected continuously.

BRIEF DESCRIPTION OF THE DRAWINGS

The following detailed description, given by way of example and not intended to limit the present invention solely thereto, will best be understood in conjunction with the accompanying drawings in which:

FIGS. 2A–2D are schematic representations of a track format including the signals recorded by the present invention;

FIG. 3 is a schematic representation of a track pattern recorded by rotary head recording apparatus which incorporates the present invention and which operates in a "standard play" (SP) mode;

FIGS. 5A–5C are schematic representations of track patterns and signal waveforms which are useful in understanding how automatic track following is attained;

FIGS. 9A–9F are timing diagrams which are useful in understanding the operation of the apparatus shown in FIG. 8.

DETAILED DESCRIPTION OF A PREFERRED EMBODIMENT

Figure 1:
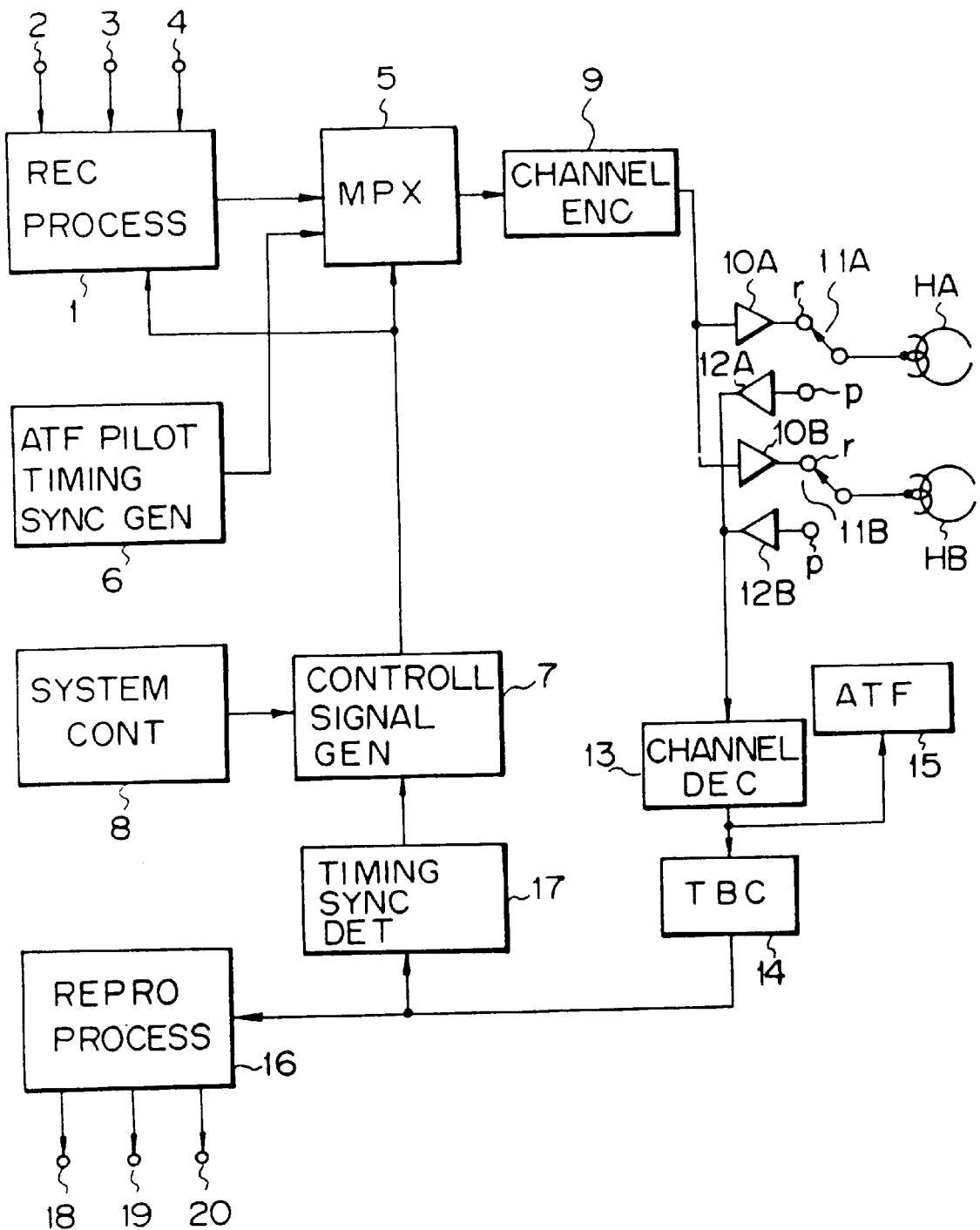
FIG. 1 is a block diagram of recording/reproducing apparatus in which the present invention finds ready application.

One example of rotary head recording/reproducing apparatus in which the present invention finds ready application is illustrated in the block diagram shown in FIG. 1. It is assumed that this apparatus is adapted to record and reproduce video, audio and subcode signals in digital form on a magnetic tape. Nevertheless, it will be apparent that the present invention can be used in apparatus which records only digital video signals or digital audio signals or other types of information signals in parallel tracks on a record medium not necessarily limited to magnetic tape. In the embodiment wherein digital video signals are recorded, it will be appreciated that one frame of digital video information, along with associated digital audio information and subcode data are recorded in a plurality of tracks. For example, and as has been proposed, one frame of digital video information in the NTSC format may be recorded in ten tracks. Separate head assemblies HA and HB having different azimuth angles and angularly spaced apart by, for example, 180°, are used to record and reproduce successive tracks on the record medium. By using different azimuth angles, the phenomenon known as azimuth loss is turned to account to minimize undesired cross-talk interference that may be picked by, for example, head HA from an adjacent track previously recorded by head HB. Although each assembly is illustrated in FIG. 1 as comprising a single head, it will be appreciated that each head assembly may be formed of two or more closely spaced heads, admitting of different azimuth angles and adapted to record/reproduce a like number of parallel tracks substantially simultaneously.

The apparatus shown in FIG. 1 includes a recording section comprised of a processing circuit 1, a multiplexer 5, a pilot and timing sync data generator 6, a control signal generator 7 and a channel encoder 9. Processing circuit 1 includes input terminals 2, 3 and 4 to which digital video, digital audio and subcode signals, respectively, are supplied. Processing circuit 1 may be of a conventional type adapted to compress the digital video signals, for example, by orthogonal transform encoding, such as discrete cosine transformation (DCT) and variable length coding. In addition, the compressed digital video signal may be further encoded by using conventional error correction codes. The processing circuit also may include suitable audio processing circuitry to compress and error-correct the digital audio signal supplied thereto via input terminal 3. The precise construction and operation of processing circuit 1 forms no part of the present invention per se; and in the interest of brevity and to avoid unnecessary detail and complexity, further description of this processing circuitry is omitted.

Pilot and timing sync data generator 6 is adapted to generate a pilot signal and also timing sync data, both limited to a predetermined time duration corresponding to a track following area. The pilot signal admits of a predetermined frequency; and as will be described, depending upon the particular track following area in which the pilot signal is recorded, this frequency may be a single frequency $f_1$ or may be frequency $f_1$ followed by a different frequency $f_2$. The pilot frequencies $f_1$ and $f_2$ may be produced by frequency-dividing a system clock signal whose repetition rate is substantially higher than $f_1$ or $f_2$.

Generator 6 also generates timing sync data which, as will be described below, is comprised of a plurality of timing sync data blocks, each block being of predetermined length and each block including a synchronizing data pattern (such as, for example, an alternating bit pattern), identification data (referred to hereinafter as ID data) and error correcting data associated with such ID data. As will also be described, the timing sync data blocks precede the pilot signal; and in those track following areas which precede the information signal area of a track, timing sync data blocks also are recorded in the track following area in both preceding and following relationship with respect to the pilot signal. This is shown more particularly in FIGS. 2B and 2C, discussed below. It will be appreciated, therefore, that pilot and timing sync data generator 6 operates to generate a pilot signal during a portion of each track following area (the pilot signal may be of frequency $f_1$ or of frequency $f_1$ followed by frequency $f_2$), and in the remainder of the track following area, generator 6 generates a plurality of timing sync data blocks. One of ordinary skill in the art will readily appreciate how the pilot signal and timing sync data blocks may be generated, and further description of the construction of generator 6 is not necessary.

Multiplexer 5 is coupled to processing circuit 1 and to pilot and timing sync data generator 6 and is responsive to a control signal supplied thereto from control signal generator 7 to time division multiplex the digital information signals supplied from the processing circuit and the pilot and timing sync data supplied from generator 6. The control signal generator is coupled to a system controller 8 which establishes, inter alia, recording, reproducing and after-recording modes. The system controller also controls the control signal generator to supply a suitable multiplex control signal to multiplexer 5, whereby either the pilot and timing sync data supplied by generator 6 or the digital information supplied by processing circuit 1 are coupled to the output of the multiplexer. More particularly, control signal generator 7 produces a track following control signal of a duration substantially equal to a track following period and an information control signal of a duration substantially equal to an information period. Thus, during the track following period, multiplexer 5 couples to channel encoder 9 the pilot and timing sync data; and during the information period, the multiplexer couples to the channel encoder the digital audio, video and subcode information. Thus, control signal generator 7 operates in conjunction with multiplexer 5 to define the allocated track following and information areas in each track.

Channel encoder 9 is adapted to encode the signals supplied thereto from multiplexer 5 in conventional recording codes, such as one or more of 1,8 code, MFM code, MTFM, or the like. The encoded signals produced by the channel encoder are coupled to rotary head assemblies HA and HB via record amplifiers 10A and 10B and the record contacts r of record/playback switches 11A and 11B, respectively. Thus, when head assembly HA is rotated into a recording relation with the record medium, the encoded signals produced by channel encoder 9 are supplied to head assembly HA via record amplifier 10A. Similarly, when head assembly HB rotates into recording relation with the record medium, the encoded signals produced by channel encoder 9 are supplied to head assembly HB by recording amplifier 10B. For the embodiment wherein the encoded signals are recorded on a magnetic tape, successive, parallel oblique tracks are recorded by rotary head assemblies HA and HB.

Before describing the track format which is recorded by the recording section of the illustrated apparatus, reference is made to the reproducing section shown in FIG. 1 which includes a channel decoder 13, a timebase corrector 14, a processing circuit 16 and a timing sync detector 17. Channel decoder 13 operates in a manner complementary to that of channel encoder 9 and is coupled to rotary head assemblies HA and HB by playback amplifiers 12A and 12B and the playback contacts p of record/playback switches 11A and 11B, respectively. The channel decoder thus recovers from the reproduced signals the pilot and timing sync data that had been generated by generator 6 and also the video, audio and subcode information that had been produced by processing circuit 1.

The output of channel decoder 13 is coupled to timebase corrector 14 and also to an automatic track following (ATF) circuit 15. The ATF circuit operates to detect a tracking error by sensing the reproduced pilot signal and, depending upon the detected tracking error, the speed at which the record medium is transported is controlled so as to minimize such error. For example, if the record medium is a magnetic tape driven by a capstan, the tracking error detected by ATF circuit 15 is used in a servo loop to control the capstan motor, thereby eliminating such tracking error.

Timebase corrector 14 may be of conventional construction and is adapted to remove timebase errors, such as jitter or other timebase deviations, from the reproduced signals. Since timebase correctors are devices which are known to those of ordinary skill in the art, further description thereof is not provided herein.

Timebase corrector 14 is coupled to processing circuit 16 which operates in a complementary manner-to processing circuit 1 and serves to recover from the reproduced, timebase corrected signals video, audio and subcode signals at output terminals 18, 19 and 20, respectively. Processing circuit 16 may include error correcting circuitry to detect and correct errors in the various digital signals supplied thereto, such as the digital audio signal that is reproduced from the record medium. It will be appreciated that errors in the digital video signal likewise may be corrected or compensated. Processing circuit 16 forms no part of the present invention per se and is not described further. It will be recognized, however, that the processing circuit recovers digital video, audio and subcode signals at output terminals 18, 19 and 20, respectively.

Timing sync detector 17 is coupled to timebase corrector 14 and is adapted to detect the timing sync data included in the track following areas scanned by heads HA and HB. A preferred embodiment of the timing sync detector is described in greater detail below in conjunction with FIG. 8. Suffice it to say that the timing sync detector operates to detect the ID data included in each timing sync data block and uses that ID data to establish the after-record area in which information data is after-recorded. Timing sync detector 17 is coupled to control signal generator 7, the latter being responsive to after-record area defining signals produced by the timing sync detector to control processing circuit 1 and multiplexer 5 so as to after-record audio, video or subcode information in the defined after-record area. Thus, when the established after-record area is scanned by heads HA and/or HB, processing circuit 1 and multiplexer 5 are suitably controlled to record the appropriate information signals in the established after-record area. As a result, there is no erroneous or inadvertent erasure or over-writing of pre-recorded signals. Rather, only those signals which are to be replaced are over-written.

Processing circuit 1 and multiplexer 5 are controlled by the control signal produced by control signal generator 7 to record successive oblique tracks on the record medium in the track format shown schematically in FIG. 2A. For convenience, the left side of the track shown in FIG. 2A is referred to as the head entering end (or "in side") and that portion of the track shown at the right side of FIG. 2A is identified as the head leaving end (or "out side"). Those sections of the track which are shown as cross-hatched lines are identified as margins and interblock gaps in which data is not recorded. The length of each section is represented in terms of bytes; and it is seen that data-free margins are recorded at the head entering and head leaving ends of the track of a length approximately equal to 450 bytes.

Information signal areas are identified as an audio information area (shown as AUDIO 1) which precedes a video area (VIDEO), the video area being followed by another audio area (shown as AUDIO 2) and this audio area is followed by the subcode area (SUBCODE). Each information area is preceded by a preamble and followed by a postamble which contain repetitive 1,0 patterns having a frequency equal to or a multiple of the data clock frequency of the digital audio, video and subcode information. The clock frequency recorded in these "amble" areas thus may be recovered by a phase locked loop (PLL) which extracts such clock pulses in order to synchronize the clock in the reproducing section normally used to recover information from the track.

A track following area ATF1 is disposed in the vicinity of the head entering end of the track shown in FIG. 2A and another track following area ATF2 is disposed in the vicinity of the head leaving end. A timing preamble section, identified as "T-amble" precedes the track following area ATF1 and a clock signal may be recorded in this T-amble area to synchronize the clock normally used to detect the recorded timing sync data.

Information recorded in audio information area AUDIO 1 or video information area VIDEO or audio information area AUDIO 2 or subcode information area SUBCODE are adapted to be after-recorded. Thus, after the information shown in the track of FIG. 2A has been recorded, one or more of the information areas AUDIO 1, VIDEO, AUDIO 2 and SUBCODE may be after-recorded at a later time. The present invention defines the after-recording areas for AUDIO 1, VIDEO, AUDIO 2 and SUBCODE, as will be described.

Although separate audio information areas AUDIO 1 and AUDIO 2 are illustrated in FIG. 2A, it will be appreciated that a single audio information area can be provided, such as by extending the length of area AUDIO 1 and deleting area AUDIO 2.

As will be described, by defining an information signal area, such as the audio information area AUDIO 1, with high accuracy, audio information may be after-recorded in area AUDIO 1 without undesirably extending the after-recording area into the VIDEO area and, thus, avoiding the undesired erasure or over-writing of information in the VIDEO area.

The format of track following areas ATF1 and ATF2 when information signals are recorded in standard play (SP) and long play (LP) modes are illustrated in FIGS. 2B and 2C. From FIG. 2A, it is seen that the length of each track following area ATF1 and ATF2 is equal to 180 bytes. It is appreciated that head assemblies HA and HB scan successive tracks A and B. respectively, across the record medium. Assuming that each track A and B admits of the same format shown in FIG. 2A, the signal content of track following area ATF1 in track A differs from the signal content of track following area ATF1 in track B. In accordance with one embodiment of the present invention, in the SP mode, a pilot signal of frequency $f_1$ is recorded in a portion of track following area ATF1, as shown in FIG. 2B, and timing sync data blocks are recorded in the remainder of this track following area. In the illustrated embodiment, six timing sync data blocks [1], [2], ... [6] precede pilot signal $f_1$, and fourteen timing sync data blocks [17], [18], ... [29] and [30] follow the pilot signal. Each timing sync data block is of predetermined data length, such as 6 bytes, and a preferred format of a timing sync data block is described below in conjunction with FIG. 2D.

FIG. 2B also illustrates the signal content of track following area ATF 1 recorded in track B during the SP mode. Here, the pilot signal is comprised of two successive pilot frequencies $f_1$ and $f_2$, these two frequencies being preceded by eleven timing sync data blocks [1], [2], ... [10] and [11]. Here too, the timing sync data is of predetermined length, such as 6 bytes, and exhibits the same format as the timing sync data blocks recorded in track A. It is appreciated that the track following areas recorded in tracks A and tracks B contain the pilot signal recorded in a portion of the track following area and the remainder of the track following area contains a plurality of timing sync data blocks. The pilot signal admits of a single frequency signal $f_1$ in, for example, track A, and the pilot signal consists of frequency $f_1$ recorded in one portion of the track following area followed by frequency $f_2$ recorded in a succeeding portion of the track following area in track B.

In the SP mode, the track pitch of the record track shown in FIG. 2A is 9 μm, the offset distance $D_x$ between the beginning of track A and the beginning of track B (best seen in FIG. 3) is 4.54 μm, the length of the track following area ATF is 22.67 μm (this length is equal to 180 bytes) and the width of the head which is used to record the track is 10.5

μm. On the other hand, when data is recorded in the LP mode, the speed at which the record medium is transported is slower than the transport speed used in the SP mode. Consequently, the track pitch in the LP mode is 6 μm, the offset distance $D_x$ between the beginning of track A and the beginning of track B is 3.51 μm and the length of the track following area ATF is 33.48 μm. Of course, since the same head assembly is used for recording in both the SP and LP modes, the head width remains at 10.5 μm. As shown in FIG. 2C, the track following area ATF1 recorded in track A in the LP mode contains the pilot signal of frequency $f_1$ recorded in a portion of the track following area, this pilot signal being preceded by eleven timing sync data blocks [1], [2], . . . [10] and [11]; and an additional nine timing sync data blocks [22], [23], . . . [29] and [30] are recorded in the remainder of the track following area following pilot signal $f_1$. As also shown in FIG. 2C, pilot signals of frequency $f_1$ followed by frequency $f_2$ are recorded in a portion of track following area ATF1 in track B, these pilot signals being preceded by fourteen timing sync data blocks [1], [2], . . . [13] and [14]. Although the formats of the track following areas in tracks A and B are quite similar in the SP and LP modes, a comparison of FIGS. 2B and 2C indicates that specific details in these formats differ from one mode to the next.

FIG. 2D is a schematic illustration of the data format of each 6-byte timing sync data block. As shown, each timing sync data block includes a synchronizing data pattern of a length equal to 2 bytes, followed by identification (ID) data, also formed of 2 bytes, followed by error correcting data (IDP) associated with the ID data, this error correcting data being formed of 1 byte and, for example, may consist of parity data. This parity data may be formed of four bits. Finally, the timing sync data block includes one byte of blank data.

The two bytes of ID data may be formed of the following bits:

In the first byte, the most significant bit identifies the recording mode as either SP or LP.

The seventh bit is not defined.

The sixth and fifth bits are used to identify the type of data which may be after-recorded, such as whether the data is audio data, video data or subcode data.

The fourth bit to the least significant bit are not defined.

In the second byte, the most significant bit, the seventh bit and the sixth bit are not defined.

The fifth bit to the least significant bit constitute a 5-bit number which identifies the timing sync data block. In the examples shown in FIGS. 2B–2C, this 5-bit number identifies the position of the timing sync data block in the track following area, such as block number [1] or block number [2], . . . or block number [30]. It will be appreciated, then, that the timing sync data block number represented by the ID data thus represents the distance from that timing sync data block to the beginning of the audio area or the beginning of the video area or the beginning of the subcode area, depending upon which type of information is to be after-recorded. For example, since the length of track following area ATF1 is known (e.g. it is 180 bytes) and the length of the audio preamble and intergap also is known (e.g. it is 174 bytes), then the distance from any timing sync data block to the beginning of the AUDIO 1 area likewise is known once the position of that timing sync data block within the track following area is sensed. Similarly, the distance from any detected timing sync data block to the beginning of the VIDEO area or to the beginning of the AUDIO 2 area or to the beginning of the SUBCODE area is known once the identification, or location within the track following area of that timing sync data block is detected. It also is recognized that the position of the timing sync data block represents the position of head HA or HB as the head scans the record track.

The track patterns in the vicinity of the head entering end and the head leaving end of successive record tracks A and B for the SP mode are illustrated in FIG. 3. It is assumed that rotary head assemblies HA and HB scan tracks A and B in the direction represented by x from the head entering end to the head leaving end. The offset distance $D_x$ between the beginning of track A and the beginning of track B is equal to the offset distance between the end of track A and the end of track B. The pilot signal in the track following areas at the head entering end and at the head leaving end of tracks A and B are shown as pilot signal $f_1$ and pilot signal $f_2$, as the case may be, and the timing sync data blocks are represented as $f_T$. In one embodiment, the pilot signal $f_1$ or $f_2$ is recorded in a track following area over a distance equal to $2D_x$. It is seen that in track following area ATF1 in track A, the pilot signal $f_1$ is recorded over the length $2D_x$ and is preceded and followed by timing sync data blocks $f_T$. In track following area ATF1 of track B, timing sync data blocks $f_T$ first are recorded and then the pilot signal $f_1$ is recorded for the length $2D_x$ followed by the pilot signal $f_2$ which is recorded for another length $2D_x$.

This track pattern recorded in track following areas ATF1 at the head entering end are reversed in track following areas ATF2 at the head leaving end. Thus, the pattern formed of the pilot signal and timing sync data blocks recorded in track following ATF2 for track B is seen to be the same as the pattern recorded in track following area ATF1 for track A. Similarly, the pattern of the timing sync data blocks $f_T$ and pilot signals $f_1$ and $f_2$ recorded in track following area ATF2 of track A is similar to the pattern recorded in track following area ATF1 of track B. It will be appreciated that pilot and timing sync data generator 6 of FIG. 1 may be constructed in a relatively simple, straightforward manner to produce the record signal having the format shown in FIGS. 2B–2D and recorded with the pattern shown in FIG. 3. For example, a suitable burst generator (or generators) may be used to provide the pilot signal $f_1$ and the pilot signal $f_2$ each for a duration corresponding to the length $2D_x$. Also, a suitable ID data generator may be incremented to produce the successive timing sync data blocks having successive ID data of the type discussed above. As an example, a counter may be incremented from a count of [1] to a count of [30] and then reset, thereby generating successive timing sync data blocks having the ID pattern shown in FIG. 2B.

The pilot signal $f_1$ or $f_2$ may be generated by dividing the frequency of the system clock by a suitable divisor. For example, if the system clock $f_o$ is on the order of about 21.65 MHz, then the pilot frequency $f_1$ may be $f_o/33=656$ kHz; and pilot frequency $f_2$ may be $f_2=f_o/22=984$ kHz. It will be appreciated that these values of the pilot frequencies $f_1$ and $f_2$ are intended to be examples only. Other suitable pilot frequencies may be used, provided that $f_1 \neq f_2$. Preferably, $f_1 < f_2$, although this relationship simply is preferable and is not a necessity.

Figure 4:
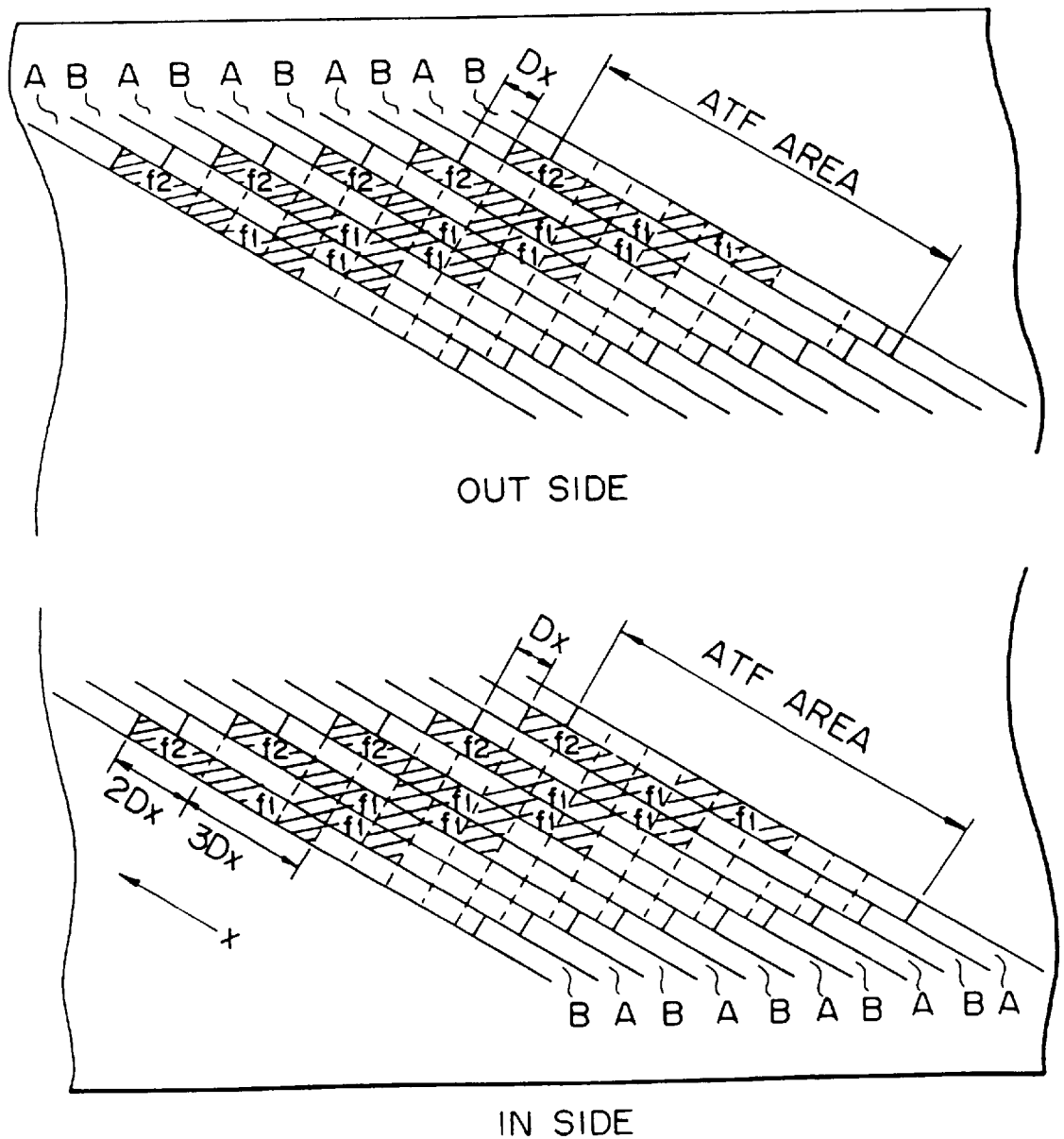
FIG. 4 is a schematic representation of a track pattern recorded by rotary head recording apparatus which incorporates the present invention and which operates in a "long play" (LP) mode.

FIG. 4 is a schematic representation of the track following areas ATF1 and ATF2 recorded in tracks A and B by head assemblies HA and HB, respectively, operating in the LP mode. It is seen that the offset distance $D_x$ from the beginning of track A to the beginning of track B in the LP mode is less than the offset distance $D_x$ in the SP mode. When recording the pilot signal in the LP mode, the pilot signal $f_1$ is recorded over a distance equal to $3D_x$ and the pilot signal $f_2$ is recorded over a distance equal to $2D_x$. Although not identified by specific legend in FIG. 4, it will be recognized that in track following area ATF1 for track A, the timing sync data blocks are recorded in advance of and then following pilot signal $f_1$, whereas in track B, the timing sync data blocks are recorded in advance of pilot signal $f_1$ which is followed by pilot signal $f_2$. As was the case when recording in the SP mode, the pattern of timing sync data blocks and pilot signals recorded in track following area ATF2 in track B is substantially the same as the pattern recorded in track following area ATF1 in track A; and the pattern recorded in track following area ATF2 in track A is substantially the same as the pattern recorded in track following ATF1 in track B. It will be understood that the pilot frequencies $f_1$ and $f_2$ recorded in the LP mode are the same as the pilot signal frequencies $f_1$ and $f_2$ recorded in the SP mode; and as a numerical example, $f_1$=656 KHz and $f_2$=984 KHz.

The pilot signal frequency pattern shown in FIGS. 3 and 4 permit accurate detection of tracking errors and facilitate the correction of such tracking errors. However, tracking error detection and correction can be readily obtained by recording pilot signals in other patterns; and the pilot signals need not be limited solely to the patterns shown in FIGS. 3 and 4. An example of yet another pattern of pilot signals which facilitate tracking error detection and correction is shown in FIG. 5A, which illustrates the recording of pilot signals of frequency $f_1$ in tracks A of the track following area disposed in the vicinity of the head entering end and of frequency $f_2$ in tracks B. Similarly, FIG. 5C illustrates the recording of pilot signals of frequency $f_2$ in tracks A in the track following area at the head leaving end of each track and frequency $f_1$ in tracks B. For convenience, the recording of timing sync data blocks in tracks A and B in the track following areas at the head entering end and at the head leaving end of the respective tracks is not illustrated.

The manner in which the pilot signals recorded in the patterns shown in FIGS. 5A and 5C are used to detect and correct tracking errors now will be described in conjunction with the waveforms shown in FIG. 5B. For simplicity, it is assumed that the width of the head, such as head HA or head HB, is equal to the pitch of each track A and B and, moreover, it is assumed that there is substantially no variation in the waveform of the pilot signal which is reproduced from each track. It also is assumed that the azimuth angle of head HA is equal to the azimuth angle of the head which recorded pilot signals in tracks A; and the azimuth angle of head HB is equal to the azimuth angle of the head which recorded the pilot signals in tracks B. Accordingly, when head HA scans a track A to reproduce the pilot signals that had been recorded in the track following areas of the respective tracks in the vicinity of the head entering end, pilot signal of frequency $f_1$ is reproduced with a relatively higher amplitude and, because of azimuth loss, the pilot signal of frequency $f_2$ which is reproduced as a cross-talk component from one or the other of adjacent tracks B admits of a much lower amplitude. This is shown in FIG. 5B(i). A suitable detector adapted to detect the pilot signal of frequency $f_1$, for example, a detector that is particularly tuned to this frequency, generates an output pulse PO shown in FIG. 5B(ii). One-shot pulse generators, such as monostable multivibrators, respond to the trailing edge of pulse PO to produce sampling pulses P1 and P2 shown in FIG. 5B(iv). The inherent time delays of such pulse generators, or monostable multivibrators, are such that sampling pulses P1 and P2 are timed to occur substantially in the middle of the period during which the cross-talk component of pilot signal $f_2$ is picked up from adjacent tracks B. These sampling pulses sample the cross-talk pilot signal $f_2$ picked up by head HA, and FIG. 5B(iii) illustrates the envelope of these cross-talk components as E1 and E2, respectively. Accordingly, sampling pulse P1 samples the envelope of the cross-talk pilot signal $f_2$ which, as shown in FIG. 5B(v), results in the sampled level E1; and sampling pulse P2 samples the envelope of the cross-talk pilot signal $f_2$ which, as shown in FIG. 5B(vi), results in the sampled level E2.

It is appreciated that, when head HA is properly centered on track A in FIG. 5A, the level of the cross-talk pilot signal $f_2$ picked up by head HA from each of adjacent tracks B is equal. However, if head HA drifts in the upward direction, the level of the cross-talk pilot signal $f_2$ sampled by sampling pulse P1 is greater than the level of the cross-talk pilot signal $f_2$ sampled by pilot signal P2. The difference between the sampled cross-talk envelopes (E1–E2) represents the direction and degree by which head HA drifts from the center line of track A. Accordingly, a subtraction circuit is provided to subtract the sampled cross-talk pilot signal E2 from the sampled cross-talk pilot signal E1 (or vice versa) to produce a tracking error indication. This tracking error indication is used as a drive control signal to drive the capstan motor which transports the magnetic tape, thereby providing tracking control correction. Of course, if other record media are used, the aforementioned tracking error indication is fed back to the medium transport arrangement so as to drive the medium in a manner which corrects for this detected tracking error.

A similar tracking error detection arrangement may be used to sense the tracking error of heads HA and HB as such heads scan the head leaving end of respective tracks. In one embodiment, the tracking error obtained when head HA, for example, scans a track following area in the vicinity of the head entering end is averaged with the tracking error detected when that head scans the track following area in the vicinity of the head leaving end so as to produce an average tracking error indication. Tape speed and, thus, tracking error correction, is controlled as a function of this average tracking error indication.

It is appreciated that, by relying upon tracking error indications produced from head HA as well as head HB, the possibility that a valid tracking error indication from one of these heads may not be produced because of "clogging" means that tracking area correction may be achieved simply by relying upon the tracking error indication derived from the other head. It also will be appreciated that if the tracking error indication produced by one head appears to be of a zero level but the tracking error indication produced by the other head is not, the presence of, for example, head clogging may be readily detected.

Figure 6:
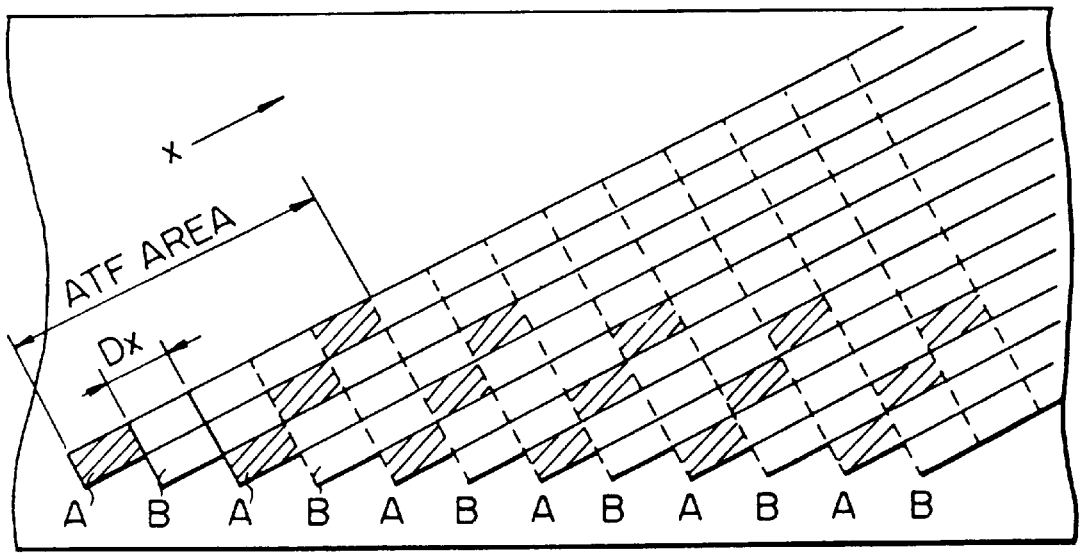
FIG. 6 is a schematic representation of another example of a track pattern showing the pilot and timing sync data signals recorded in track following areas.
Figure 7:
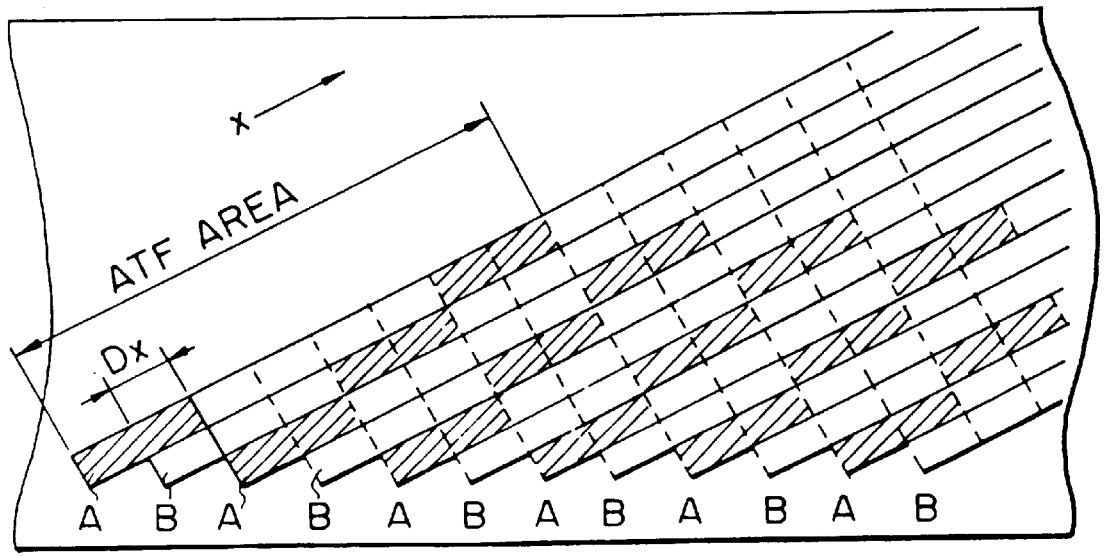
FIG. 7 is a schematic representation of yet another track pattern showing the pilot signal and timing sync data signals recorded in track following areas.

FIGS. 6 and 7 are schematic representations of still further track patterns of pilot signals that may be recorded in the track following area of each track. For simplification, FIGS. 6 and 7 do not illustrate the timing sync data blocks that also are recorded. The pattern shown in FIG. 6 is recorded during the SP mode and that shown in FIG. 7 is recorded during the LP mode. In both the SP and LP modes, the pilot signal admits of only a single frequency, such as $f_1$ (or $f_2$). In one example, the pilot frequency may be on the order of about 1 MHz.

Each track following area in the SP mode may be thought of as being divided into five successive segments, each admitting of a length equal to $D_x$, the offset distance between adjacent tracks. As shown, in each of tracks A, the pilot signal is recorded in the first $D_x$ segment and then in the last $D_x$ segment. In each of track B, the pilot signal is recorded only in the third $D_x$ segment, that is, in the middle of the track following area. The pattern in which the pilot signal is recorded in the LP mode, as shown in FIG. 7, is similar to that recorded in the SP mode. In the LP mode, each track following area may be thought of as being divided into eight successive segments, each of length $D_x$. In track A, the pilot signal is recorded in the first two $D_x$ segments and in the last two $D_x$ segments. In track B, the pilot signal is recorded only in the fourth and fifth $D_x$ segments, which is seen to be the middle of the track following area.

In both the SP and LP modes, tracking errors are detected as follows: When head HA scans track A, the pilot signal recorded in track A is reproduced with a relatively high amplitude, and the trailing edge of the pulse produced from the detected pilot signal is used to produce sampling pulses which sample the cross-talk pilot signal components picked up by head HA from upper adjacent track B and from lower adjacent track B. Any difference in the sampled cross-talk pilot signal components is indicative of the direction and magnitude of a tracking error.

Similarly, when head HB scans tracks B, the pilot signal reproduced from track B admits of a relatively large amplitude; and the trailing edge of the pulse produced from this pilot signal is used to produce sampling pulses which coincide with the cross-talk pilot signal reproduced by head HB from upper adjacent track A and from lower adjacent track A. Here too, any difference between the sampled cross-talk pilot signals is indicative of the direction and degree of tracking error.

FIGS. 6 and 7 illustrate the pilot signal pattern recorded in the track following areas disposed in the vicinity of the head entering end of each track. It will be appreciated that a similar pilot signal pattern is recorded in the track following areas disposed in the vicinity of the head leaving end of each track. For example, the pattern recorded in the track following area in the vicinity of the head entering end of track A may be recorded in the track following area in the vicinity of the head leaving end of track B. Consequently, tracking errors present at the head entering end as well as at the head leaving end are detected and corrected.

Figure 8:
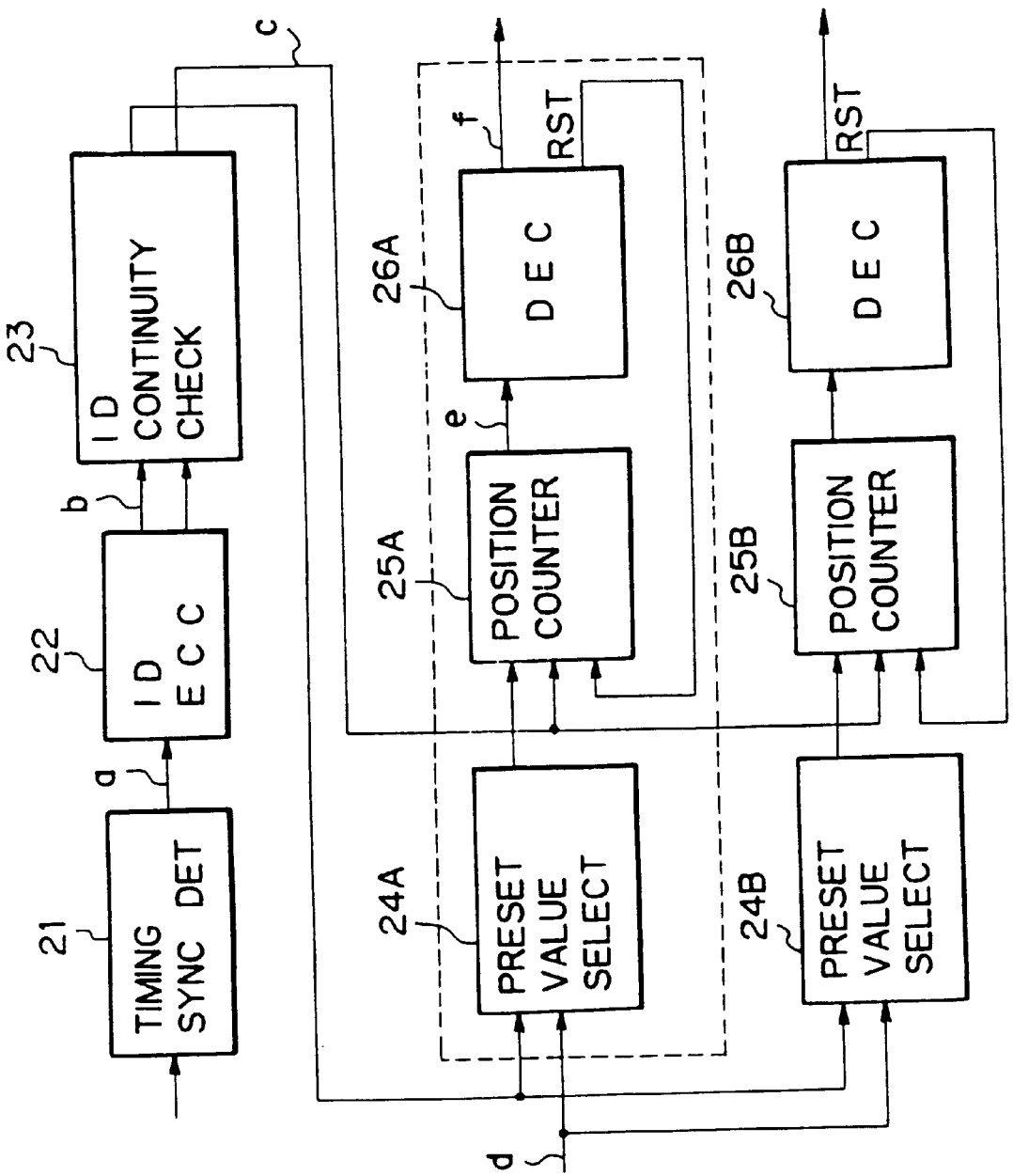
FIG. 8 is a block diagram of a preferred embodiment of apparatus in accordance with the present invention which defines an after-recording area with high accuracy.

Turning now to FIG. 8, there is illustrated a block diagram of one embodiment of the present invention which operates to establish an after-record area in the audio, video or subcode information area referenced from the timing sync data blocks which have been recorded in the track following area, as shown for example in FIGS. 2A–2D. It will be appreciated that the block diagram shown in FIG. 8 is a preferred embodiment of timing sync detector 17 and that portion of control signal generator 7 which is relevant to this invention. The after-record area defining apparatus shown in FIG. 8 is comprised of a timing sync detector 21, an ID continuity check circuit 23, preset count selector circuits 24A and 24B, position counters 25A and 25B and decoders 26A and 26B. It will be appreciated that preset count selector circuit 24A, position counter 25A and decoder 26A are included in a channel A and normally are responsive to timing sync data blocks reproduced from track A by head HA; and preset count selector circuit 24B, position counter 25B and decoder 26B are included in a channel B responsive to timing sync data blocks reproduced from track B by head HB. The circuits included in channel A are substantially the same as those included in channel B and, in the interest of brevity, only one of these channels is described in detail.

Timing sync detector 21 is adapted to detect the timing sync data blocks shown in, for example, FIG. 2D. As an example, the particular synchronizing pattern included in the 2-byte sync portion may be sufficiently unique as to be readily detected. Upon detection, the ID data and ID parity data included in the detected timing sync data block are supplied to an ID error correcting circuit 22 for the purpose of correcting the ID data included in the detected timing sync data block. The ID error correcting circuit may be of a known type which uses ID parity data to detect errors present in the ID data and to correct those errors. Assuming that the ID data is correct or correctable, ID error correcting circuit 22 is adapted to supply to ID continuity check circuit 23 a data valid signal b which admits of a relatively high level if the ID data supplied to the ID error correcting circuit is correct or correctable, and also supplies to the ID continuity check circuit the correct (or corrected) ID data itself.

ID continuity check circuit 23 is adapted to detect when a predetermined number n (preferably, n>2) of consecutive ID data has been detected by timing sync detector 21. For example, when the timing sync data block [1] included in a track following area is received, the ID data representing this timing sync data block sets a counter included in the ID continuity check circuit. Then, upon the detection of each successive timing sync data block, this count is incremented by one. The ID continuity check circuit includes a comparator which compares the incremented count of this counter to the ID data included in the next-following timing sync data block. If the incremented count matches the ID data, a continuity counter is incremented by one. When this continuity counter reaches a predetermined count n, such as n=3, thus indicating that three successive, consecutive timing sync data blocks have been detected, a counter load signal c is produced by ID continuity check circuit 23. However, if a discontinuity is present in the timing sync data blocks which are detected, for example, if, because of errors in the reproduced data, as may be caused by jitter, dropout or the like, the ID data representing timing data sync block [3] is not detected, ID continuity check circuit 23 does not produce counter load signal c. But, if timing sync data blocks [4], [5] and [6] are properly detected in succession, then the ID continuity check circuit generates the counter load signal.

The counter load signal produced by ID continuity check circuit 23 is coupled to position counters 25A and 25B, respectively, for the purpose of loading a preset count into these counters, as will be described.

The ID continuity check circuit also couples to another output thereof the ID data which represents the presently detected timing sync data block and which is supplied thereto from timing sync detector 21 by way of ID error correcting circuit 22. This present ID data is coupled to preset count selector circuits 24A and 24B. Each preset count selector circuit is adapted to produce a preset count value in response to each ID data supplied thereto. This preset count value may be thought of as representing the distance from the present timing sync data block represented by the ID data supplied to the preset count selector circuit to the beginning of the after-record area. Thus, as each timing sync data block is detected, the count value representing the distance from that timing sync data block to the beginning of the after-record area changes. As one example thereof, each preset count selector circuit may be formed as a look-up table that is addressed by the ID data recovered from each detected timing sync data block to supply to the position counter coupled thereto the particular count corresponding to that ID data.

Preset count selector circuits 24A and 24B are coupled in common to receive the ID data recovered from the presently detected timing sync data block; and each preset count selector circuit is coupled to an input terminal to receive a switching pulse d which is used to select one or the other of the preset count selector circuits for operation. As will be described, switching pulse d indicates whether head HA or HB is in scanning relationship with a track A or B, respectively, and as one example, the switching pulse admits of a relatively high level to enable preset count selector circuit 24A when head HA scans a track A and admits of a relatively low level to enable preset count selector circuit 24B when head HB scans track B.

Preset count selector circuit 24A is coupled to position counter 25A and is adapted to load, or preset, the position counter with the preset count selected in response to the present ID data supplied to the preset count selector circuit, provided that ID continuity check circuit 23 produces counter load signal c. The position counter is adapted to count data clock pulses which are recovered from the record medium when head HA scans track A. Although not shown, a phase locked loop may be provided to recover these data clock pulses which may be recorded in, for example, the preamble, postamble or T-amble areas of a record track, such as shown in FIG. 2A. These data clock pulses also may be recovered from the synchronizing bit pattern included in each timing sync data block. In any event, the clock pulses which are counted by position counter 25A are produced as head HA scans a record track; and it will be appreciated that the instantaneous count of the position counter thus represents the instantaneous position of the head along the track scanned thereby.

Decoder 26A is coupled to position counter 25A and is adapted to decode particular counts to which the position counter is incremented. For example, when the position counter attains a maximum count, this maximum count is decoded to produce a reset signal RST which is fed back by decoder 26A to a reset terminal of position counter 25A. As will be described, this maximum count $N_{max}$ is reached when the head rotates to the head leaving end of the record track shown in FIG. 2A.

Decoder 26A also is adapted to sense when the count of position counter 25A reaches a predetermined first count $N_1$ and a second count $N_2$. This first count $N_1$ corresponds to the position of the head at the beginning of an after-record area; and the count $N_2$ corresponds to the position of that head when it reaches the end of the after-record area. For example, counts $N_1$ and $N_2$ may define the AUDIO 1 area, the VIDEO area, the AUDIO 2 area or the SUBCODE area shown in FIG. 2A. In one embodiment, decoder 26A produces an after-record signal f which admits of a relatively high level when the head scans the after-record area.

The interconnection and operation of preset count selector circuit 24B, position counter 25B and decoder 26B are substantially the same as that discussed above in conjunction with these same circuits included in channel A. Although both position counters and decoders operate when both heads HA and HB scan tracks A and B, respectively, it is appreciated that only one or the other position counter is preset by the count produced by preset count selector circuit 24A or 24B, depending upon whether head HA or head HB then is scanning the record track.

The manner in which the apparatus illustrated in FIG. 8 operates now will be described in conjunction with the timing and waveform diagrams shown in FIGS. 9A–9F. FIG. 9A schematically represents the timing sync data blocks recorded in track following areas ATF1 and ATF2 at the head entering and head leaving ends of each track. For simplicity, only five timing sync data blocks are illustrated; and it is appreciated that FIG. 9A does not illustrate the presence of pilot signals $f_1$ and $f_2$ which are present in the track following areas. In any event, FIG. 9A schematically represents the detected timing sync data blocks supplied to ID error correcting circuit 22 by timing sync detector 21.

FIG. 9B schematically illustrates the valid ID data pulse produced by ID error correcting circuit 22 when valid, or correct, identification data is detected. This valid ID data pulse enables ID continuity check circuit 23 to sense the continuity of successive ID data which is recovered from the track following area. If, as discussed above, n successive timing sync data blocks are detected, the ID continuity check circuit produces a counter load signal c; and the production of this signal is schematically illustrated in FIG. 9C. If, for example, n=3, the counter load signal is generated in response to each third timing sync data block, assuming that there is no discontinuity or errors in detecting those blocks.

FIG. 9D illustrates head switching pulse d and, as discussed above, it is assumed that head HA scans track A when head switching pulse d admits of a relatively high level; and head HB scans track B when the head switching pulse admits of a relatively low level. When the head switching pulse exhibits its high level, preset count selector circuit 24A is enabled and responds to the ID data included in the presently detected timing sync data block supplied thereto by ID continuity check circuit 23 to produce a count value corresponding to this ID data. As mentioned above, this count value may be thought of as representing the distance from the present timing sync data block to the beginning of the after-record area. This preset count also may be thought of as representing the distance from the beginning of the record track to the detected timing sync data block. In any event, this count represents the present position of the head as it scans the record track and is coupled to position counter 25A. If ID continuity check circuit 23 has produced the counter load signal c, position counter 25A is loaded, or preset with this count. The position counter counts the aforementioned data clock pulses so as to increment its count, as schematically depicted in FIG. 9E, from a reset count to a maximum count. It is expected that if there is no jitter or error in recovering data clock pulses, the preset count to which position counter 25A is loaded will be the count normally reached by the position counter at that time. However, and advantageously, by presetting the position counter to a count corresponding to the ID data in the presently detected timing sync data block, the position counter is preset to its proper count even if jitter, dropout or other errors may be present to interfere with the accurate recovery of data clock pulses.

As the count e of position counter 25A increments, such as such in FIG. 9E, decoder 26A senses when this count is equal to the count of $N_1$. At that time, the decoder produces an output pulse f, such as shown in FIG. 9F, whose leading edge corresponds to the count of $N_1$ and whose trailing edge corresponds to the count of $N_2$. The duration of this pulse f produced by decoder 26A defines the after-record area and is referred to as the after-record pulse. That is, the leading edge of this pulse provides the after-record start indication and the trailing edge provides the after-record end indication. As mentioned above, the duration and position of this pulse f is determined by the predetermined counts $N_1$ and $N_2$ and establishes the after-record area in substantial coincidence with the AUDIO 1 area, the VIDEO area, the AUDIO 2 area or the SUBCODE area, as may be desired.

It is seen that, even after the after-record pulse f is produced, position counter 25A continues to increment its count until it reaches the maximum count $N_{max}$. This maximum count is decoded by decoder 26A to return a reset pulse RST to the position counter, thereby resetting the count thereof. A comparison of FIGS. 9A and 9E indicates the position counter is reset at the time that a head reaches the head leaving end of a track, which substantially coincides with the time that the next head rotates to the head entering end of the next track.

It is appreciated that the after-record pulse shown in FIG. 9F is produced first by decoder 26A of channel A, then by decoder 26B of channel B, then by decoder 26A of channel A, and so on. This after-record pulse is generated accurately, even if errors or dropouts are present in the recovered data clock pulses or in the detected timing sync data blocks because position counters 25A and 25B are preset by the preset counts produced by preset count selector circuits 24A and 24B from the ID data actually detected in the respective timing sync data blocks. By using ID continuity check circuit 23, a reasonable assurance is provided that the ID data is valid and correct. Nevertheless, it will be appreciated that the ID continuity check circuit or, alternatively, the ID error correcting circuit 22 may be omitted, if desired.

In the present invention, timing sync data blocks are recorded in the track following area disposed in the vicinity of the head entering end as well as the track following area disposed in the vicinity of the head leaving end of each track. The ID data included in the timing sync data blocks of, for example, track following area ATF2 may be used by preset count selector circuits 24A and 24B to produce preset counts which represent the instantaneous position of head HA or head HB as the head scans the track following area ATF2, thus assuring that position counters 25A and 25B are preset, or loaded, with proper counts. This means that if dropout or errors are present in track following area ATF1 so that the timing sync data blocks therein cannot be detected accurately, the position counters nevertheless are preset with accurate counts in response to the ID data detected from track following area ATF2. Consequently, the position counters will reach their predetermined counts $N_1$ and $N_2$ when heads HA and HB are in accurate registration with the desired after-record area, and after-record pulse f will be produced by decoders 26A and 26B even if such dropouts or errors are present in track following area ATF1.

It is preferred to record pilot signals $f_1$ and $f_2$ (or, in the alternative arrangements discussed above, only pilot signal $f_1$ need be recorded) rather than rely upon the synchronizing bit pattern of each timing sync data block to represent the pilot signal. This is because the synchronizing bit pattern of the timing sync data block typically is detected by supplying that bit pattern through a notch filter which blocks the frequency component of the pilot signal. This assures proper detection of the pilot frequency for tracking error detection and correction and also assures proper detection of each timing sync data block. Hence, if the synchronizing bit pattern also represents the pilot signal, this filtering operation prevents tracking error detection and correction from being performed accurately. Moreover, the timing sync data block normally is code converted, such as by 6–8 conversion, which further inhibits accurate detection of the pilot signal frequency if the synchronizing bit pattern is used as the pilot signal.

Preferably, and as mentioned above, the synchronizing bit pattern included in the sync byte of each timing sync data block may be equal to or derived from the system clock frequency.

While the present invention has been particularly shown and described with reference to a preferred embodiment, it will be readily appreciated by those of ordinary skill in the art that various changes and modifications may be made without departing from the spirit and scope of the invention. For example, only a single track following area may be recorded, such as the track following area disposed in the vicinity of the head entering end of a record track. Also, the pilot signal which is used for tracking error detection and correction can be recorded in other areas of the record track and need not be limited solely to the track following area. For example, the pilot signal can be superimposed over the entire length of the record track.

As another alternative to the embodiment described herein, position counters 25A and 25B can be preset with counts derived from the ID data included in timing sync data blocks disposed in track following area ATF1 only. That is, the presetting of the position counters in response to preset counts derived from the ID data recovered from timing sync data blocks included in track following area ATF2 can be omitted. Still further, position counters 25A and 25B may be used to count reference count pulses that are produced independently of the recovered data clock pulses. However, it is preferred to synchronize the clock pulses counted by the position counters ID with the recovered data clock pulses so that the position count represents the actual position of head HA or HB as the head scans a record track. Other equivalent means may be used such that the instantaneous count of the position counter is an accurate representation of the actual position of the head.

It is, therefore, intended that the appended claims be interpreted as including the embodiment described specifically herein, those alternatives which have been discussed above and all equivalents thereto.

What is claimed is:

1. In rotary head recording apparatus of the type having first and second head means for recording respective oblique tracks on a record medium, each track including an information signal area in which information data is recorded preceded by a track following area, said apparatus comprising: pilot signal generating means for generating a tracking control pilot signal; timing data generating means for generating timing sync data, said timing sync data including identification data which identifies the position of the timing sync data in the track following area of the track and which is indicative of a distance between the timing sync data and the information signal area; and control means coupled to said pilot signal and timing data generating means for recording said timing sync data in said track following area.

2. The apparatus of claim 1, wherein said timing sync data further includes a synchronizing data pattern and error correcting data associated with said identification data.

3. The apparatus of claim 1 wherein said timing sync data is comprised of plural timing sync data blocks, each of predetermined data length.

4. The apparatus of claim 3 wherein each timing sync data block includes a synchronizing data pattern, identification data and error correcting data associated with said identification data.

5. The apparatus of claim 4 wherein said timing sync data blocks precede said pilot signal in said track following area.

6. The apparatus of claim 5 wherein said pilot signal exhibits a single frequency.

7. The apparatus of claim 6 wherein additional timing sync data blocks follow said pilot signal in said track following area.

8. The apparatus of claim 5 wherein said pilot signal is formed as a first signal exhibiting a first frequency followed by a second signal exhibiting a second frequency.

9. The apparatus of claim 1 wherein a respective track includes a head entering end whereat a respective head means rotates into recording relation with the record medium and a head leaving end whereat said respective head means rotates out of recording relation with said record medium, and said track following area is disposed in the vicinity of said head entering end.

10. The apparatus of claim 9 further comprising an additional track following area disposed in the vicinity of said head leaving end.

* * * * *